United States Patent [19]

Membreno

[11] 4,209,728
[45] Jun. 24, 1980

[54] OUTDOOR LIGHTING SYSTEM AND METHOD

[75] Inventor: Robert J. Membreno, Los Altos, Calif.

[73] Assignee: Sai Engineers, Inc., Santa Clara, Calif.

[21] Appl. No.: 947,566

[22] Filed: Oct. 2, 1978

[51] Int. Cl.² .................................................. H05B 37/02
[52] U.S. Cl. ............................ 315/159; 250/214 AL; 307/141; 315/156; 315/360
[58] Field of Search ....................... 315/156, 159, 360; 307/117, 141; 250/214 AL, 239

[56] References Cited
U.S. PATENT DOCUMENTS

| 2,295,894 | 9/1942 | Dewan | 315/360 X |
| 4,008,415 | 2/1977 | DeAvila-Serafin et al. | 315/360 X |

Primary Examiner—Eugene R. LaRoche
Attorney, Agent, or Firm—Flehr, Hohbach, Test

[57] ABSTRACT

A lighting system for illuminating a given area is disclosed herein and includes a number of luminaires, each having a light source and a light sensitive device for automatically connecting the light source to a supply of power during the dark hours of the night and for automatically disconnecting the light source during the light hours of the day. This system also includes light control circuits associated with some but preferably not all of the luminaires. Each light control circuit overrides the operation of an associated light sensitive device and automatically disconnects its light source from the power supply for a predetermined period during the dark hours at a time when it is not important to provide a high degree of illumination, for example in the middle of the night.

6 Claims, 4 Drawing Figures

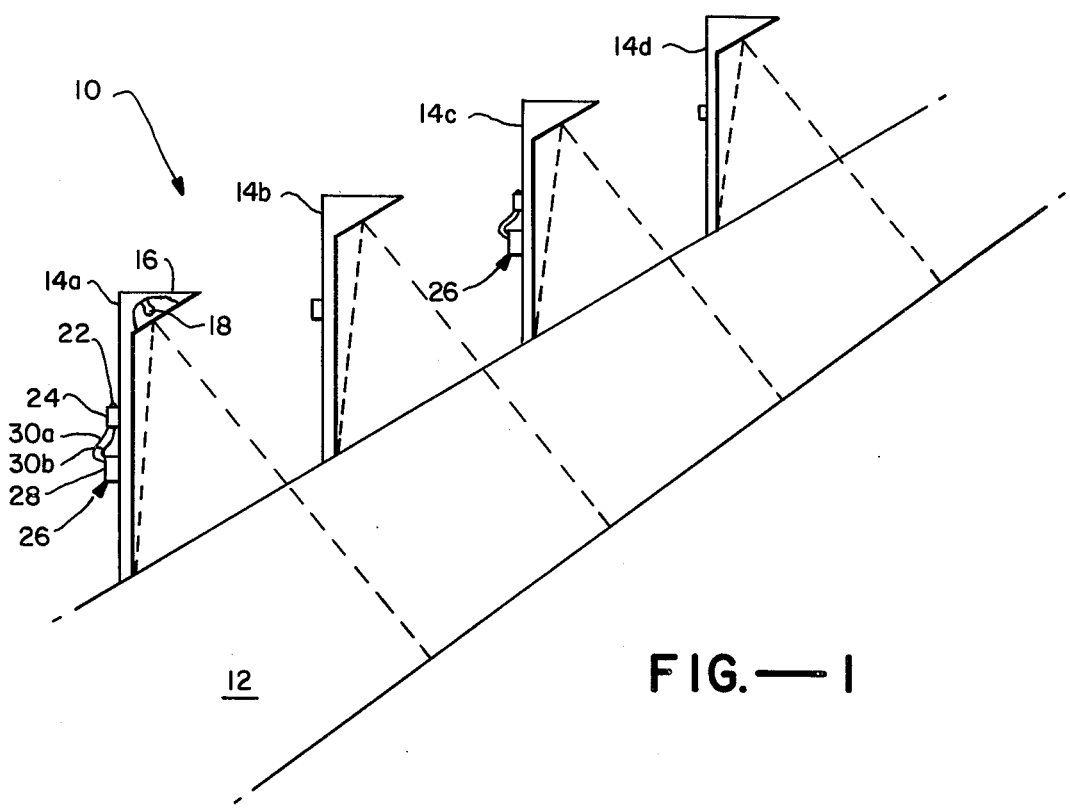
FIG.—1
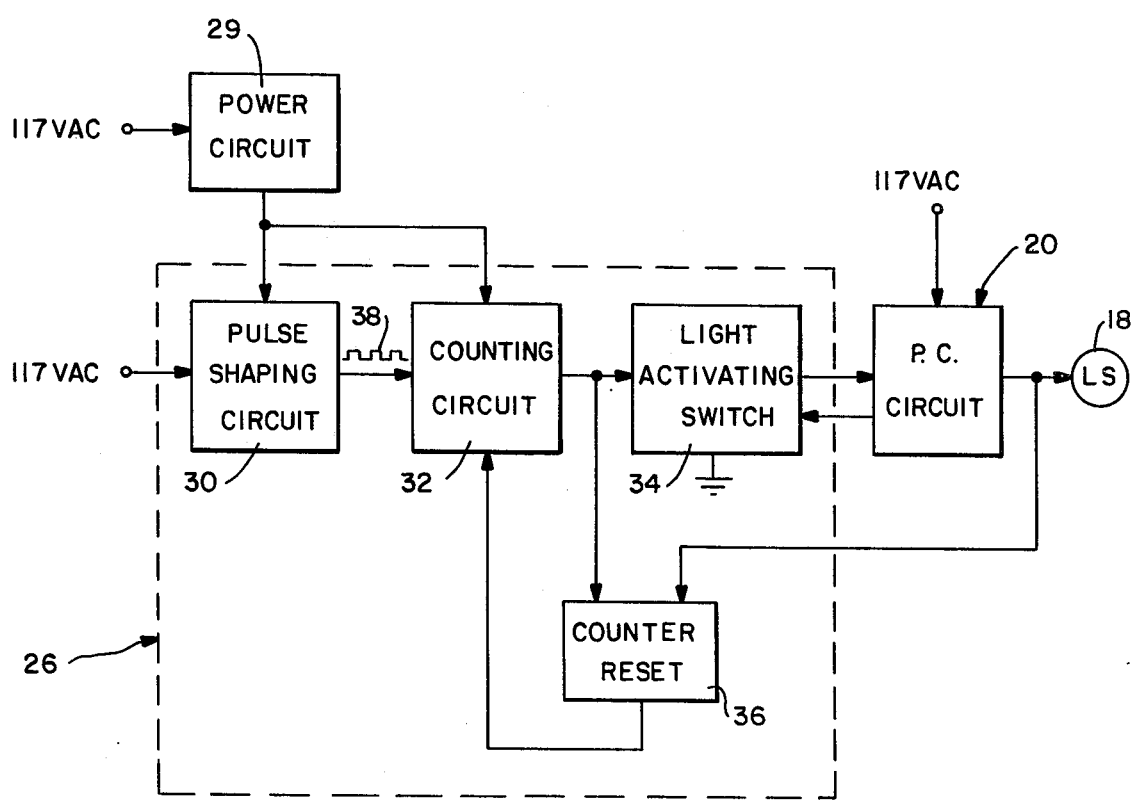
FIG.—2

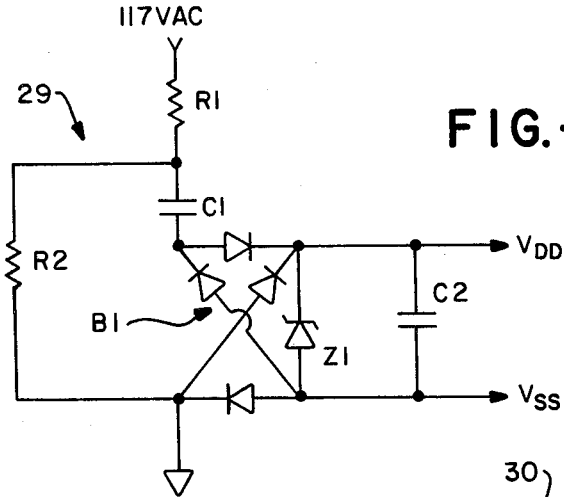
FIG.—3
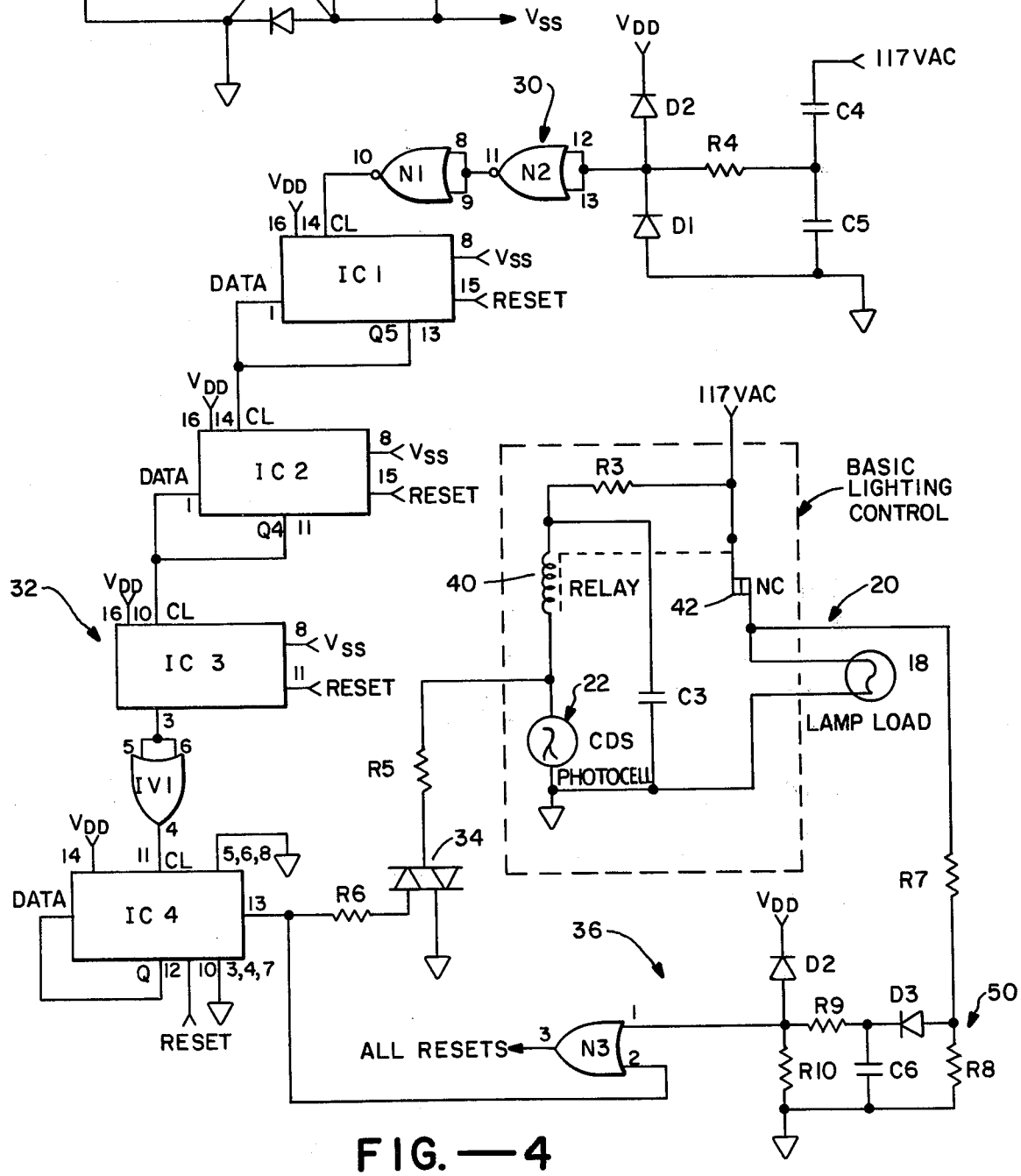
FIG.—4

OUTDOOR LIGHTING SYSTEM AND METHOD

BACKGROUND OF THE INVENTION

The present invention relates generally to luminaires which are controlled by light sensitive devices and more particularly to an assembly for a method of overriding the operation of such a device to turn off the luminaire for a predetermined period of time during the night in order to conserve energy.

Many outdoor luminaires, particularly street lights, are automatically turned on and off by a light sensitive device responsive to the level of natural light in the immediate area. As a result, at night when it gets dark, the lights automatically come on and stay on until morning when they are automatically turned off. In many situations, it is not necessary to maintain a high degree of illumination throughout the entire dark hours of the night. As will be seen hereinafter, the present invention recognizes this and provides a specific means for and method of overriding the light sensitive device associated with a given luminaire for turning the latter off for a predetermined period of time during the night, specifically during a period when a high level of illumination is not required, thereby conserving energy.

OBJECTS AND SUMMARY OF THE INVENTION

One object of the present invention is to provide a luminaire which is energy conscious even though it automatically turns on at night and off the next morning by means of a light sensitive device.

A more specific object of the present invention is to override the light sensitive device and turn off the luminaire just recited for a predetermined period of time during the dark hours of the night, specifically during a period when it is not necessary to provide a high degree of illumination, thereby conserving energy.

Another object of the present invention is to provide an uncomplicated, economical and yet reliable assembly for overriding the light sensitive device and particularly an assembly which can be readily incorporated into an existing luminaire controlled by means of a light sensitive device.

Still another object of the present invention is to provide an overall system for and method of lighting a given outdoor area utilizing a number of luminaires including energy conserving assemblies of the type just recited as well as luminaires without such assemblies so that the light level provided will be reduced for a predetermined period of time during the dark hours of the night but not completely eliminated.

An outdoor luminaire of the type to which the present invention is directed includes a luminaire housing adapted to support a light source and a circuit including a light sensitive device such as a photocell, light sensitive transistor, or the like. This light sensitive device operates in a first state for connecting the light source to a supply of power when the natural light in the immediate area is below a predetermined level and in a second state for disconnecting the light source from the power supply when the natural light is above the same predetermined level. In this way, the light source is automatically turned on during the dark hours of the night and automatically turned off during the light hours of the day. The present invention is directed to a light control assembly for use with an outdoor luminaire of this type. As will be seen hereinafter, this assembly includes circuit means adapted to be connected with the circuit means of the luminaire including the light sensitive device for overriding operation of the latter and disconnecting the light source from its power supply for a predetermined period of time during the dark hours even though the light sensitive device is in its light connecting first state.

This assembly can be incorporated into the luminaire during manufacturing of the latter but is preferably designed to be readily incorporated into an existing luminaire which is controlled by the light sensitive device. In this way, existing lighting systems including a number of such luminaires can be readily modified so that some of the luminaires include override assemblies while others do not. In this way, the light provided by the system, as modified, can be reduced for a predetermined period of time during the dark hours of the night but not necessarily eliminated, thereby conserving energy.

BRIEF DESCRIPTION OF THE DRAWINGS

FIG. 1 is a diagramatic illustration in perspective view of an overall lighting system designed in accordance with the present invention.

FIG. 2 is a block diagram of an arrangement for controlling the light source comprising part of an overall luminaire and particularly an arrangement including a light control circuit assembly designed in accordance with the present invention.

FIG. 3 is a schematic illustration of a power supply used in the circuit arrangement of FIG. 2.

FIG. 4 is a schematic illustration of the circuit arrangement illustrated in FIG. 2.

DETAILED DESCRIPTION AND PREFERRED EMBODIMENTS

Turning to the drawings, wherein like components are designated by like reference numerals throughout the figures, attention is specifically directed to FIG. 1 which illustrates an overall system 10 for lighting a given area, for example, a lengthwise section of a roadway 12. This is accomplished by means of outdoor luminaires such as street lights 14a, 14b, 14c and 14d mounted above and to one side of roadway section 12. With one exception to be discussed below, these street lights may be identical and hence each includes a conventional luminaire housing 16 for supporting a suitable light source 18 in a predetermined position relative to the roadway and a circuit 20 (FIGS. 2 and 4) including a light sensitive device 22 (FIGS. 1 and 4). All of the components making up this circuit with the exception of light sensitive device 22 are contained within a housing 24 which may be located outside the luminaire pole as illustrated in FIG. 1 but may also be hidden within the pole or the luminaire housing. As will be seen hereinafter, circuit 20 is responsible for connecting light source 18 to a supply of power when the natural light in the immediate area of roadway section 12 is below a predetermined level and for disconnecting the two when the natural light is above this level.

It should be apparent from the foregoing that by properly designing circuit 20 each of the luminaires thus far described will automatically turn on during the dark hours of the night and automatically turn off during the light hours of the day. However, in accordance with one aspect of the present invention, some of the luminaires comprising part of overall system 10, specifically luminaires 14a and 14c, differ from the other luminaires comprising part of the overall system. As illustrated in FIG. 1, each of the luminaires 14a and 14c includes a light control assembly 26 for overriding the operation of light sensitive device 22 and disconnecting the light source from its power supply for a predetermined period of time during the dark hours of the night. While the circuitry comprising part of this assembly will be discussed hereinafter, for the moment it suffices to say that all of the circuit components are preferably contained within a single housing 28 mounted as close as possible to the circuit components making up circuit 20. In this regard, in its preferred embodiment, assembly 26 is designed to readily interconnect with an existing circuit 20. For example, in an actual working embodiment of the present invention, as will be seen hereinafter, circuit 20 and assembly 26 are interconnected by means of two lead wires only, specifically the lead wires 30a and 30b illustrated in FIG. 1. In this way an existing luminaires such as luminaires 14b and 14d can be readily modified to include an assembly 26 so as to operate in the same manner as luminaires 14a and 14c. Of course, assembly 26 will also be connected to a supply of power.

As will be seen hereinafter, the particular period of time during which luminaires 14a and 14 remain off at night will depend upon light control assembly 26 and, as will also be seen, this can be adjusted both in point of time and in duration. As a result, during for example the winter months when darkness extends from approximately 4:30 PM to 6:50 AM, luminaires 14a and 14c can be automatically turned off at some point in time when it is not necessary to provide a high degree of illumination on the roadway, for example between 10:30 PM and 4:30 AM. On the other hand, during summer months when the period of darkness changes, assemblies 26 can be adjusted to change the time and duration of the overriding period in each luminaire. In either case, it should be noted that luminaires 14b and 14d in the system illustrated remain on throughout the entire night for providing a minimum level of light at all times.

Having described overall lighting system 10 generally, attention is now directed specifically to circuit 20 including light sensitive device 22 and assembly 26 for overriding the light sensitive device. As illustrated in the block diagram in FIG. 2, circuit 20 is provided for connecting an associated light source 18 to a source of power, specifically to 117 v AC in the embodiment illustrated during the dark hours of the night and for disconnecting the light source from the power supply during daylight. As will be seen hereinafter, the circuit components making up assembly 26 require regulated low voltage. Hence, a power circuit is provided and will be discussed in detail with respect to FIG. 3.

In order to override circuit 20 for a predetermined period during the night, assembly 28 includes a pulse shaping circuit 30, a counting circuit 32, a light actuating switch 34 and a counter reset circuit 36. As will be discussed in more detail hereinafter, pulse shaping circuit 30 is also connected with a supply of external power, specifically 117 v AC for producing a 0 to 10 v square wave output generally indicated at 38. This output functions as a timing signal for counting circuit 32 which produces either a high or low signal at its output. More specifically, at the instant light source 18 is first energized by means of circuit 20 when the natural light goes below a predetermined level, circuit 36 resets counting circuit 32 for counting out a first predetermined period of time during which the output of counting circuit 32 remains low. At the same time, the light actuating switch 34 remains deenergized (because of the low signal at the output of the counting circuit) and therefore does not affect circuit 20 in any way. However, at the end of the first predetermined period, circuit 22 begins counting a second predetermined period during which its output is high. This high signal prevents circuit 36 from resetting the counting circuit and at the same time it causes actuating switch 34 to conduct. With switch 34 in its conductive state, current through circuit 20 is caused to take a path which automatically turns off light source 18 regardless of the level of natural light in the immediate surroundings. At the end of this second predetermined period, the output at counting circuit 32 again goes low, turning off switch 34 and allowing circuit 20 to once again take control of light source 18. Hence, if it is still dark out, light source 18 will be automatically turned on, and if it is light out, the light source will remain off. In either case, as will be seen hereinafter, circuit 36 will not reset counting circuit 32 again until the light source has gone on after being off as controlled by circuit 20 (rather than assembly 26).

Before turning to a detailed description of the specific components making up circuit 20 and assembly 26, attention is directed briefly to FIG. 3 for a detailed description of power circuit 29. As stated previously, this circuit is provided for converting a 117 v AC external source to a regulated 10 v DC supply having a high side (VDD) and a low side (VSS). In order to accomplish this, the external source is coupled through an input resistor R1, a filter capacitor C1 and a parallel discharge resistor R2 to the input of a diode bridge B1 for converting the external supply to a direct voltage signal. This signal is regulated by a zener diode Z1 and filtered by means of capacitor C2, both of which are connected across the output of the circuit, as illustrated. While this particular circuit is provided in an actual working embodiment of the present invention, it is to be understood that any conventional circuit for providing the appropriate level and type of power to the components making up assembly 26 can be readily provided depending upon these components.

Turning now to FIG. 4, attention is first directed to circuit 20. As stated previously, this circuit includes a light sensitive device 22 which in the embodiment illustrated is of a type which decreases in impedance when exposed to increased light levels and increases in impedance as the light level decreases. Therefore, during the light of day device 22 acts as a closed circuit whereas during the dark hours of night it acts as an open circuit. In addition to this light sensitive device, overall circuit 20 includes an electromagnetic relay coil 40 and an associated normally closed contact 42. As seen in FIG. 4, the relay is connected in series with light sensitive device 22 as well as a resistor R3 between the external power supply and ground (neutral). At the same time, the normally closed contact is connected in series with light source 18, both of which are connected between the external power supply and ground. A filter capacitor C3 is connected across the relay and light sensitive device.

As stated previously, the circuit just described, that is, circuit 20, is a conventional circuit and does not in and by itself form the present invention. In fact, as also stated previously, this circuit may be an existing circuit comprising part of an existing luminaire which may be readily modified to include override assembly 26. In any event, circuit 20 controls power to light source 18 by means of light sensitive device 22 and its series connected relay. More specifically, during the light of day, device 22 provides little impedance between the external power supply and ground so that relay coil 40 is energized. This causes its normally closed contact to open, thereby providing an open circuit between the power supply and light source so that the latter remains off. At night when the ambient light level goes below a certain threshold, the impedance across device 22 is sufficiently high to open the circuit between relay coil 40 and ground so as to deenergize the latter and cause contact 42 to close for turning on light source 18.

Having described circuit 20 and its normal method of operation in detail, attention is now directed to the specific circuitry making up assembly 26. As illustrated in FIG. 4, pulse shaping circuit 30 includes a capacitor divider circuit including capacitors C4 and C5 which are connected between an external power supply, specifically 117 v AC and ground, and a resistor R4. This circuit is provided for dropping the 117 v AC supply to approximately 20 v AC which is converted to a 0–10 v pulsating signal by means of diodes D1 and D2. The pulse shaping circuit also includes single input NOR gates N1 and N2 (operating as inverters) which receive this pulsating signal and shape it to provide the previously described square wave 38.

As stated with respect to FIG. 2, pulse output signal 38 is applied to the input of counting circuit 32. As seen in FIG. 4, this counting circuit includes four integrated circuits IC1, IC2, IC3 and IC4 and an inverter IV1 which together operate to provide the two predetermined periods previously described. More specifically, when an actuating signal is supplied to the reset terminal of each integrated circuit, these integrated circuits along with inverter IV1 count out the first predetermined period during which the output of the last integrated circuit IC4 (terminal 13) remains low. At the end of this first period, output terminal 13 goes high and remains high for a second predetermined period. It is to be understood that this overall counting circuit in and by itself may be readily provided by those with ordinary skill in the art and includes conventional components. For example, in an actual working embodiment, each of the integrated circuits is a medium scale, low power integrated circuit. It is to be understood, however, that these components may vary depending upon economic factors and availability as well as the desired time for each of the predetermined periods. Moreover, it may be desirable to provide additional overriding periods through the night in which case the entire counting circuit could be readily modified to accomplish this.

As illustrated in FIG. 4, light actuating switch 34 in the embodiment shown is a bilateral device (triac) which can be readily connected between previously described relay coil 40 of circuit 20 and ground and thereby parallel with light sensitive device 22. In this regard, the resistor R5 is provided in series with the bilateral device to match the daytime impedance of device 22. The gate of bilateral device 34 is connected to the output of counting circuit 32, specifically to terminal pin 13 of integrated circuit IC4, through resistor R6.

Circuit 36 which, as stated previously, is provided for resetting counter circuit 32, specifically the four integrated circuits, includes a two input NOR gate N3 and an AC to DC connector circuit 50 comprised of resistors R7, R8, R9 and R10, diodes D2 and D3, and capacitor C6. As illustrated in FIG. 4, the input to circuit 50 is connected into circuit 20 (line 30b) on the neutral side of relay contact 42 and its output is connected to one of the input terminals (pin 1) of NOR gate N3. This circuit is provided for converting the 117 v AC supply applied to its input when the relay contact is closed to a DC signal for application to the NOR gate. The other input to this NOR gate (pin 2) is connected to the output of counting circuit 32, specifically to pin 13 of integrated circuit IC4. The NOR gate operates in a conventional manner. More specifically, its output remains low so long as at least one of its inputs is high and goes high only when both of its inputs goes low. As a result, the only time that the output of NOR gate N3 is high is when the output at counting circuit 32 is low while relay contact 42 is open (which means that light source 18 is off).

Having described the various components making up assembly 26 in detail, attention is now directed to the manner in which this assembly operates. First, let it be assumed that it is light out and that the relay coil 40 is energized, which means that its contact is open and light source 18 is off. Let it also be assumed that counter circuit 32 has previously counted out and has not been reset. Under these circumstances, the output of the counter circuit is low which means that switch 34 is off and therefore presents an open circuit to relay coil 40 so as not to affect the operation of light sensitive device 22. At the same time, both of the inputs to NOR gate N3 are low which means that its output is high. However, as stated previously, in order to reset the counter circuit, the NOR gate must go low.

Once nightfall approaches, light sensitive device 22 causes relay coil 40 to deenergize which causes its contact to close and turn on light 18. However, at the same time, the input pin 1 of NOR gate N3 connected through circuit 50 goes high and causes the output of NOR gate N3 to go low which, in turn, resets all of the integrated circuits making up counting circuit 32. This initiates the beginning of the first predetermined period of time referred to previously. During this period, for example for several hours, the output of circuit 32 remains low so that switch 34 is off and still does not affect the operation of light sensitive device 22. Hence, light source 18 remains on so long as it remains dark outside.

When the first predetermined period of time ends, the output at counting circuit 32 goes high causing switch 34 to conduct. Whether or not it is still dark out, switch 34 in its conducting state causes relay coil 40 to energize which, in turn, opens contact 42 for turning off light source 18. At the same time, the input 1 of NOR gate N3 goes low. However, since the output of counting circuit 32 is now high, the other input 2 of the NOR gate goes high, thereby keeping its output low so as not to affect the gating function of the counting circuit.

At the end of the second predetermined period, that is, the period during which switch 34 overrides light sensitive device 22 for maintaining light source 18 off, the output of the counting circuit again goes low causing switch 34 to turn off. As a result, light sensitive device 22 again resumes control over light source 18. If it is still dark out, this relay coil will be energized, causing the light to go on and the associated input of NOR gate N3 to go high while the other input goes low, again keeping the output of the NOR gate low. On the other hand, if it is light out, or when it eventually becomes light out, light sensitive device 22 will again cause relay coil 40 to energize for opening the relay contact 42 and turning off light 18. At this time, both of the inputs to NOR gate N3 are low so that its output is high. Therefore, the next time the output of this NOR gate goes low (when the light is again turned on by circuit 20) the various integrated circuits will automatically reset for starting the entire cycle all over again.

Having described the operation of assembly 26, it is to be understood that this operation could be carried out with circuitry different than the circuitry specifically described. Moreover, the particular components making up the circuit including their values can be readily determined by those with ordinary skill in the art based on the present disclosure.

What is claimed is:

1. An outdoor luminaire arrangement, comprising:
   (a) a luminaire housing adapted to support a light source;
   (b) first circuit means including a light sensitive device operating between first and second states in response to and depending on the level of ambient light to which said device is subjected, said device operating in said first state for connecting said light source to a source of power when the ambient light is below a predetermined level and in said second state for disconnecting said light source from said power source when the ambient light is above said predetermined level, whereby under the control of said light sensitive device said light source is automatically turned on during the dark hours of the night and automatically turned off during the light hours of the day by said first circuit means; and
   (c) second circuit means for overriding the operation of said light sensitive device and disconnecting said light source from said power supply for a predetermined period of time during said dark hours while said ambient light is below said predetermined level and said light sensitive device is in its first state, said second circuit means including counting means connected with said first circuit means for automatically starting said overriding period an initial predetermined period of time after said light sensitive device moves into its first state from its second state when said ambient light first goes below said predetermined level and for automatically ending said overriding period, and means for automatically resetting said counting means to start said initial period only after said light sensitive device moves into its first state after having been in its second state, whereby said counting means is reset only once a day.

2. An arrangement according to claim 1 wherein:
   (a) said first circuit means includes first switch means operating between
      (i) a first position when said light sensitive device is in said first state for connecting said light source to said power source, and
      (ii) a second position when said light sensitive device is in said second state for disconnecting said light source from said power source; and
   (b) said second circuit means includes second switching means connected with and responsive to said counting means for operating between
      (i) a first position at all times except during said overriding period for allowing said first switching means to operate without interference from said second switching means, and
      (ii) a second position during said overriding period for causing said first switching means to be in its second light source disconnecting position regardless of the state of said light sensitive device.

3. An arrangement according to claim 2 wherein said first switching means includes an electromagnetic relay having a relay coil connected in circuit with and operating in response to the state of said light sensitive device and a relay contact adapted for connection in circuit with said light source and said power source for connecting and disconnecting the two depending upon the state of said relay coil, and wherein said second switching means is connected in circuit with said relay coil and said light sensitive device for controlling the state of said coil during said overriding period regardless of the state of said light sensitive device.

4. An arrangement according to claim 1 including housing means containing all of the components making up said second overriding circuit means and means extending out of said housing means adapted to electrically connect said overriding circuit means with said first circuit means.

5. An arrangement according to claim 4 wherein said electrical connection means consists of two lead wires.

6. A light control assembly for use with an outdoor luminaire arrangement including a luminaire housing adapted to support a light source and circuit means including a light sensitive device operating in a first state for connecting said light source to a source of power when the ambient light is below a predetermined level and in a second state for disconnecting said light source from said power source when the ambient light is above said predetermined level, whereby said light source is automatically turned on during the dark hours of the night and automatically turned off during the light hours of the day, said assembly comprising:
   (a) circuit means adapted for overriding the operation of said light sensitive device and disconnecting said light source from said power supply for a predetermined period of time during said dark hours when said ambient light is below said predetermined level and said light sensitive device is in its first state;
   (b) circuit means for regulating power to said overriding circuit means;
   (c) housing means containing said overriding circuit means and said power regulating means to the exclusion of said means including said light sensitive device; and
   (d) means extending out from said housing means adapted to electrically connect said overriding circuit means with said device including circuit means.

* * * * *